United States Patent [19]
Harting et al.

[11] Patent Number: 6,130,944
[45] Date of Patent: Oct. 10, 2000

[54] MULTI-POSITION TELEPHONE UNIT

[75] Inventors: David G. Harting, Needham; Douglas A. Marsden, Lynnfield; Benjamin Beck, Boston; Glen Walter, Middleton, all of Mass.

[73] Assignee: 3Com Corporation, Santa Clara, Calif.

[21] Appl. No.: 09/031,627

[22] Filed: Feb. 27, 1998

[51] Int. Cl.[7] .................................................. H04M 1/00
[52] U.S. Cl. ........................................... 379/435; 379/436
[58] Field of Search .................................... 379/428, 435, 379/436, 446, 454, 455

[56] References Cited

U.S. PATENT DOCUMENTS 4,710,596  12/1987  Kurokawa ................................ 379/435

FOREIGN PATENT DOCUMENTS 2326283  12/1974  Germany .............................. 379/435

*Primary Examiner*—Jack Chiang
*Attorney, Agent, or Firm*—McGlew and Tuttle, P.C.

[57] ABSTRACT

A one piece stand is utilized with a telephone console to provide multiple console orientations with respect to a mounting surface. The stand includes two or more mounting surfaces, each of which can be mounted to the base of the console to provide a particular angular orientation. A biased handset hook is also included. The hook can be switched between wall mount and desk mount configurations without removal from the console by using an access port on the base of the console. A spring force maintains the hook in a desired position in a bayonet fitting. The spring-loaded hook can absorb the force from a handset by retracting into the console without breaking and returning to its normal position when the force is removed.

29 Claims, 5 Drawing Sheets

6,130,944

MULTI-POSITION TELEPHONE UNIT

FIELD OF THE INVENTION

The invention relates generally to a telephone unit including a stand that provides multiple telephone configurations. In particular, the invention relates to a telephone console having a reconfigurable handset hook and a multi-position stand for different console orientations.

BACKGROUND OF THE INVENTION

Telephone units are staple items in everyday business and personal life. The requirements for users can vary widely. Manufacturers have attempted to accommodate users by providing interchangeable wall mount and desk mount configurations. Due to the preferences of the individual user, however, it is impractical to produce a telephone console which offers a single angular orientation that is suitable for all users. As a result, some telephone units are provided with multiple component stands. Such stands require the user to assemble the various components to achieve the desired console inclination angle. Other telephone units include single element stands where the user attaches a specific stand to achieve a particular inclination angle. For single element stands, the user must maintain a set of replacement stands to change the console orientation in the future.

Wall mounted telephone units require structure to retain the handset when not in use. Typically, a handset hook is provided in a fixed position so that the hook engages a complementary portion of the handset preventing the handset from falling out of the cradle. Telephone units frequently include handset hooks which can be removed or placed in a different configuration to avoid interference with the handset in the cradle. To remove a handset hook which is otherwise flush with the cradle surface, a recessed area is provided immediately adjacent the end of the handset hook. This permits access to the hook by a user's fingers or an extraction tool. When the hook is removed, the hook can be lost or damaged before it can be replaced in the unit. In addition, the handset hook can be inadvertently damaged by the user in the wall mount configuration. If the user returns the handset to the cradle with excessive force, the hook can fracture or break.

SUMMARY OF THE INVENTION

A multi-position telephone unit has been developed which includes a one piece stand that can orient the telephone console at multiple inclination angles with respect to a mounting surface.

The telephone console includes a base and a stand which can be attached in a first position on a bottom surface of the base. The base can include one or more feet along its bottom surface. In one embodiment, the feet are comprised of a material which resists sliding across the mounting surface. In another embodiment, the base includes one or more clips used to secure the stand to the base.

The stand includes a first surface and a first remotely disposed contact zone to orient the telephone console at a first angle relative to a mounting surface. The stand also includes a second surface and a second remotely disposed contact zone to orient the telephone console at a second angle relative to the mounting surface. In one embodiment, the first angle is between about 3° and about 15° and the second angle is between about 15° and about 45°. In another embodiment, the first surface of the stand is attached to the bottom surface of the base at a second position to orient the telephone console at a third angle relative to the mounting surface. Each contact zone includes a load-bearing surface which can be in the form of one or more feet which can include pads or strips of a non-skid material. The stand can have a cross-section described by a closed line figure. In one embodiment, the closed line figure is approximately triangular. The stand can also include one or more openings for engaging mounting clips on the base.

The invention also features a telephone console having a body and a handset hook. The body includes a cradle for accepting a handset. The cradle includes one or more recessed surfaces on the upper portion of the console which receive the handset and the surface therebetween. The body also includes a wall defining an opening in the cradle and a bayonet fitting. The handset hook has an elongated body with a proximal end and a distal end, and is movable through the cradle opening. The proximal end is suited to latch a handset and the distal end is adapted to engage the bayonet fitting in at least two positions. In the first position, the proximal end protrudes into the cradle to engage the handset. In the second position, the proximal end is retracted from the cradle so that the handset cannot be engaged.

In an exemplary embodiment, the console includes a spring having a proximal end and a distal end, and a reaction surface against which the distal end of the spring reacts. The spring is disposed between the reaction surface and the handset hook to resiliently bias the handset hook into contact with the bayonet fitting. If a user returns the handset to the cradle with excessive force, the handset hook can be pushed into the console. The handset hook returns to its latch position when the force is removed. This biased mounting prevents damage to the handset hook. In one embodiment, the proximal end of the spring reacts against a tab extending transverse to the elongated body of the handset hook. An aperture formed on the bottom surface of the console can be provided to permit access to the distal end of the handset hook so that a user can actuate the handset hook between the first position and the second position.

In one embodiment, the first position of the handset hook includes a first axial position and a first circumferential position, and the second position of the handset hook includes a second axial position and a second circumferential position. The bayonet fitting can include a first slot and a second slot aligned with the elongated body of the hook to define the two positions. The tab on the handset hook is biased against a bottom of the first slot when the handset hook is in the first position. Similarly, the tab is biased against a bottom of the second slot when the handset hook is in the second position.

DETAILED DESCRIPTION

Figure 1A:
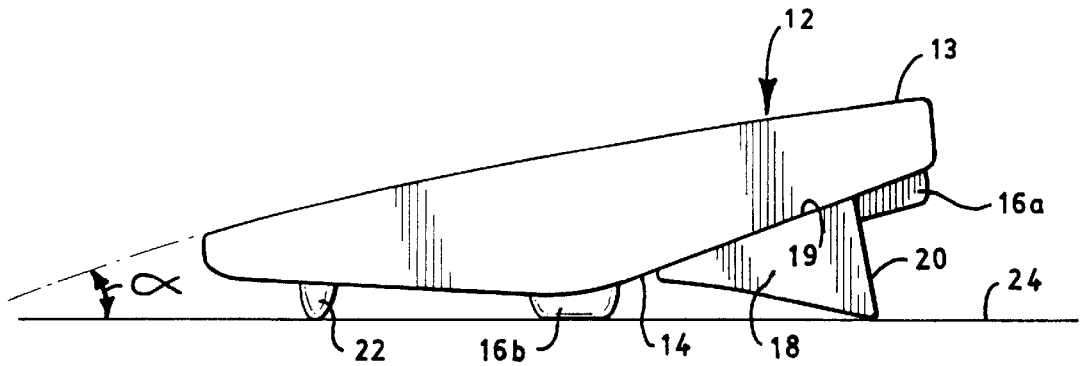
FIGS. 1A through 1C are side views of a telephone unit in various mount orientations.
Figure 1B:
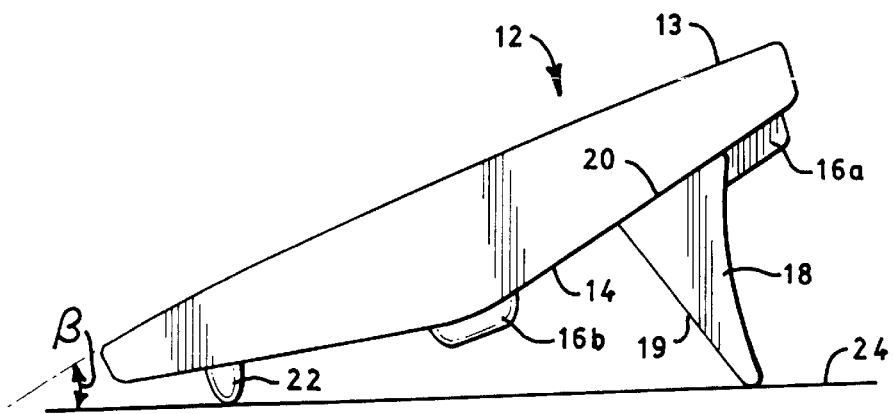

FIG. 1A shows a telephone console 12 in a first configuration supported by a stand 18 and legs 22 on a horizontal surface 24 (e.g., a table, a desktop, etc.). The legs 22 can be made from a variety of materials including rubber or any other non-skid material which prevents the telephone console 12 from sliding along the surface 24. Alternatively, the legs 22 can be fabricated from the same material as the remainder of the console 12, especially where the stand feet 30 and 32 (not shown) are fabricated from a non-skid material. The telephone console 12 includes an upper body 13 inclined at an angle α from the flat surface 24 so that a user can easily access any buttons and read any displays thereon (not shown). A first surface 19 of the stand 18 is attached to or disposed proximate to a base 14 of the telephone console 12. Referring to FIG. 1B, the telephone console 12 is shown in a second orientation in which the upper body 13 is inclined at an angle β with respect to the flat surface 24. The stand 18 is attached to the base 14 along a second surface 20. Some users can prefer this orientation where angle β is greater than angle α, especially for ease of viewing the displays on the upper body 13.

Figure 1C:
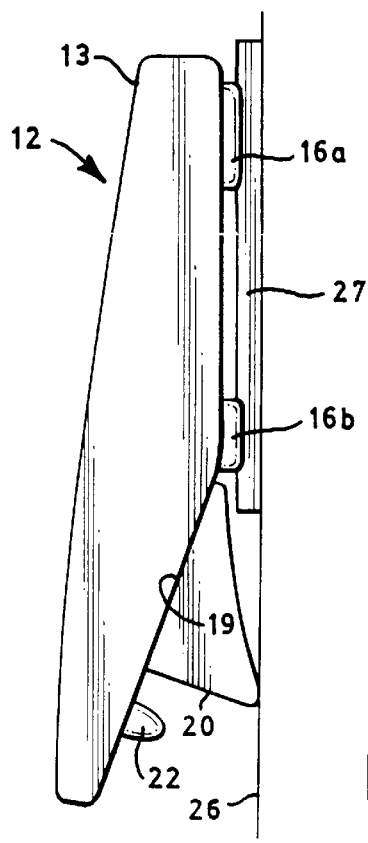

FIG. 1C shows the telephone console 12 mounted to a wall 26. The wall 26 is shown as substantially vertical; however, the console 12 can be fixedly mounted to any surface, regardless of the orientation of the surface with respect to a vertical orientation. The stand 18 is attached at its first surface 19 to the base 14 in a different base location than as shown in FIGS. 1A and 1B. Hangers 16a and 16b formed on or attached to the base 14 mate with corresponding tabs on a telephone wall mounting plate 27. The stand 18 maintains the telephone console 12 in a fixed position when a user presses the buttons (not shown) on the upper body 13.

Figure 2:
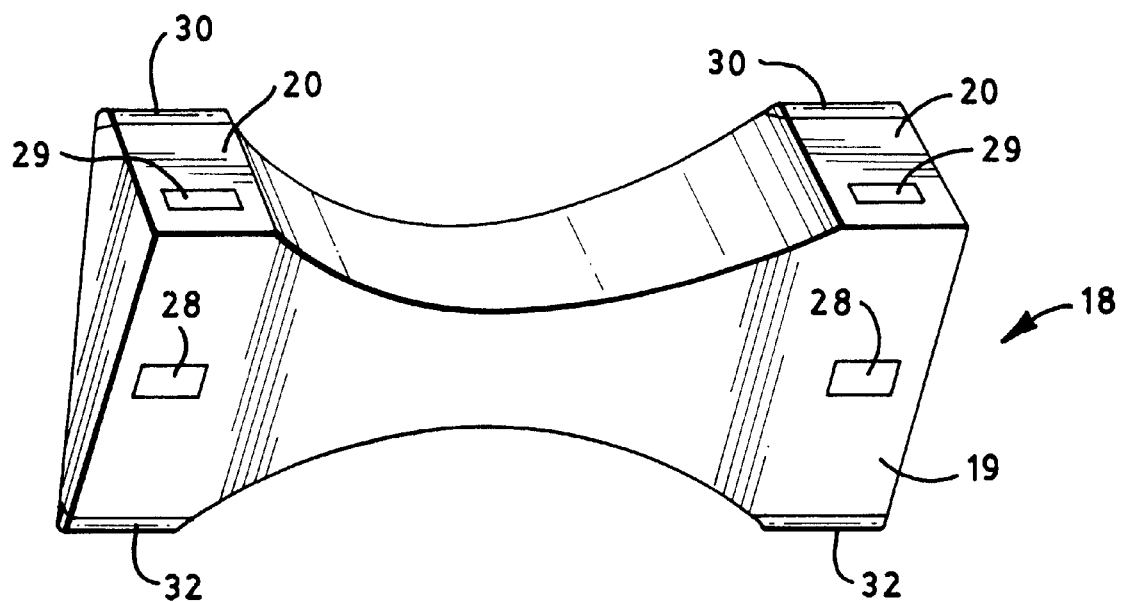
FIG. 2 is a perspective view of a multi-position stand.

FIG. 2 illustrates an example of the stand 18 which can be used to mount the telephone console 12 in any of the three orientations. The stand 18 can be made from a variety of materials, including plastic. A contact zone defined herein as the load-bearing surface or surfaces on the stand 18 which contact the mounting surface. In the illustrated embodiment, the contact zone includes portions of a pair of feet 30 which contact the mounting surface when the stand 18 is mounted in a first orientation. The first surface 19 and second surface 20 each include a pair of openings, 28 and 29, respectively forming connection portions, to receive clips 34 on the base 14 (e.g., snap fit) for securing the stand 18 to the console 12. An alternative orientation can be achieved by attaching the second surface 20 to the base 14. In this orientation, a second pair of feet 32 provide the contact zone, and the stand 18 is secured to the base 12 with a second set of clips 35. In other embodiments, the contact zone can include any number of surface areas and geometries (i.e., feet) which contact the mounting surface. The feet 30 and 32 can be constructed from rubber or other non-skid materials. Alternatively, the feet 30 and 32 can be fabricated from the same material as the remainder of the stand 18, especially where the console legs 22 are fabricated from a non-skid material.

The stand surface 19 or 20 which mates with the base 14 does not have to be continuous as long as any separate surface sections are complementary to the proximate counterpart surfaces on the base 14. For example, the separate surface sections can be substantially coplanar. This allows for a decrease in the volume and weight of the stand 18. Although the depicted stand 18 includes an approximate triangular cross-section, a wide variety of other geometric cross-sections are possible. Any cross-sectional geometry which provides multiple mounting surfaces, each adapted for mounting to the base 14 to provide a unique orientation, is suitable. Preference can be given to geometries which minimize the material required to produce the stand 18.

Figure 3:
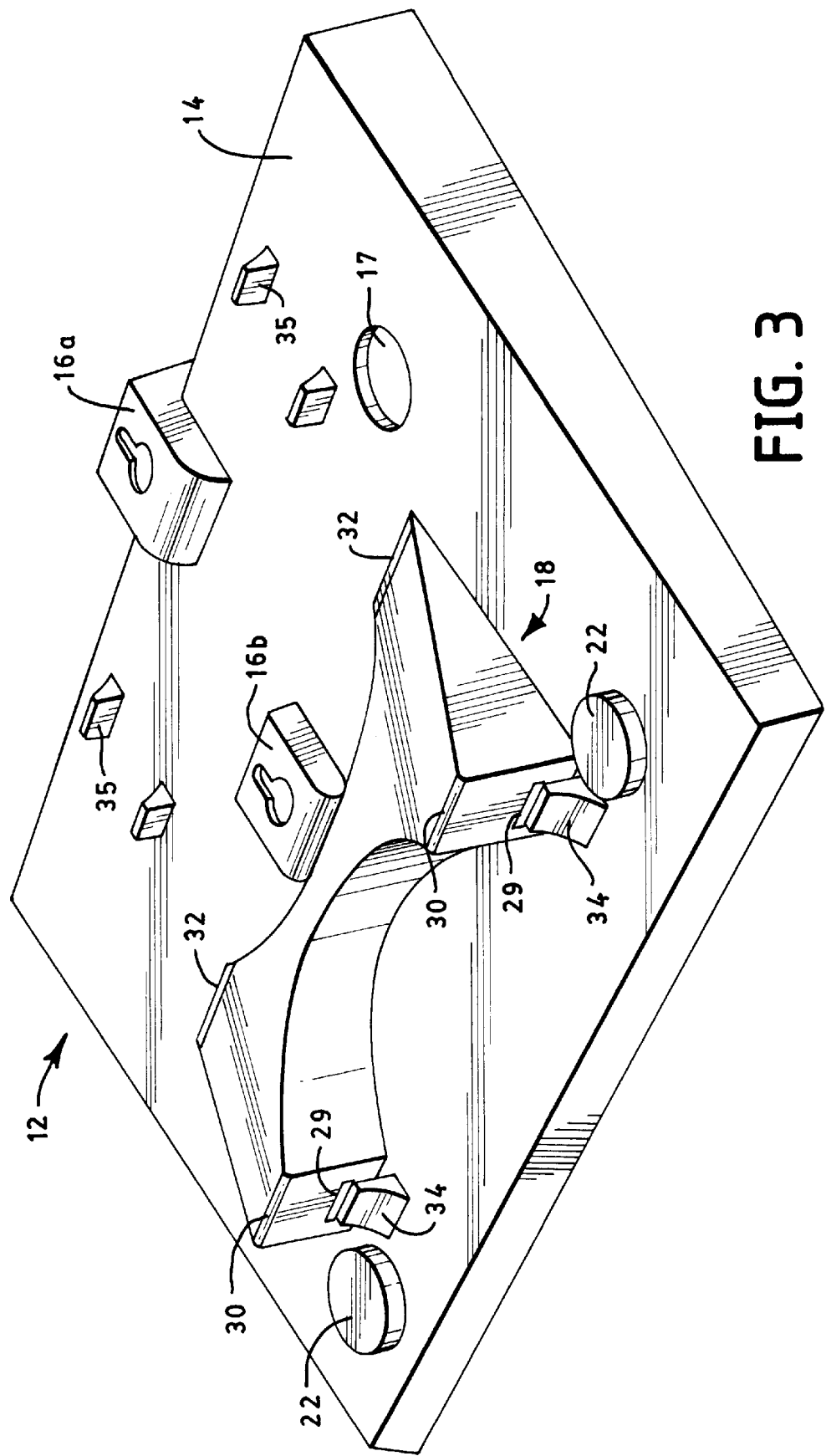
FIG. 3 is a perspective view of the bottom of a telephone unit configured for mounting to a wall.

Referring to FIG. 3, the stand 18 is shown attached to the telephone console 12 according to a wall mount configuration with clips 34 engaging the openings 29. Hangers 16a and 16b include keyhole-shaped openings which receive tabs on a conventional telephone wall mounting plate 27 to secure the console 12 to the wall 26. An access hole 17 can be provided to permit a user access to a handset hook 50 (not shown) so that the position of the hook 50 can be changed to comply with the console mounting configuration.

Figure 4A:
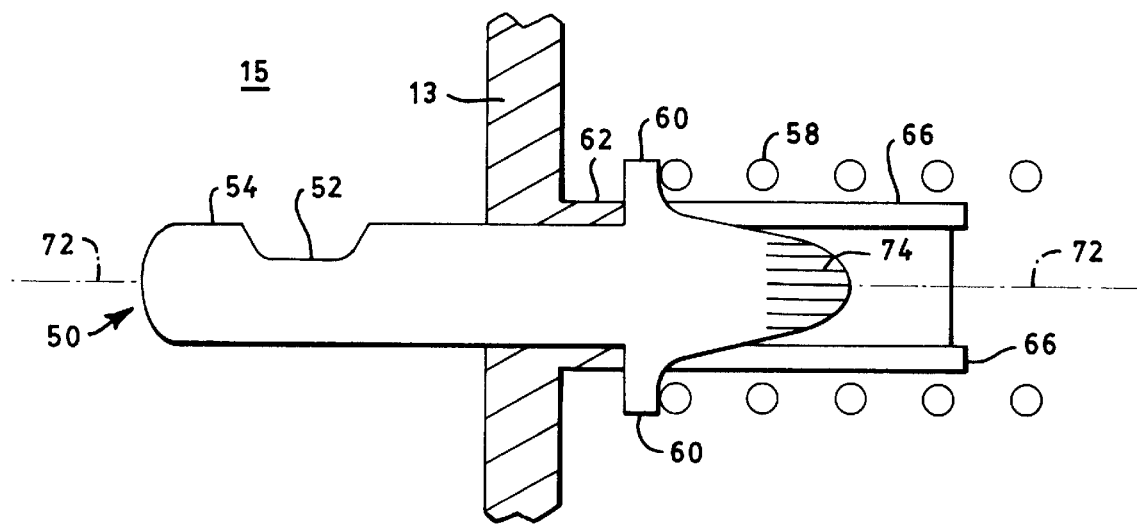
FIGS. 4A and 4B are partial cross-sectional views of a handset hook in a wall mount and a desk mount position, respectively.

Referring to FIG. 4A, a handset hook 50 is shown for use when the console 12 is in the wall mount position. The hook 50 includes a notched portion 52 and tip 54 at a proximal end thereof which are complementary to a portion of the handset surface. The hook 50 extends through a bayonet fitting 62 and protrudes outside the upper body 13 into the cradle region 15. The notched portion 52 and tip 54 support the handset when not in use. A helical spring 58 is maintained in compression between tabs 60 on the hook 50 and a reaction surface inside the base 14, thus preventing the hook 50 from retracting through the upper body 13 and into the console 12.

Figure 5:
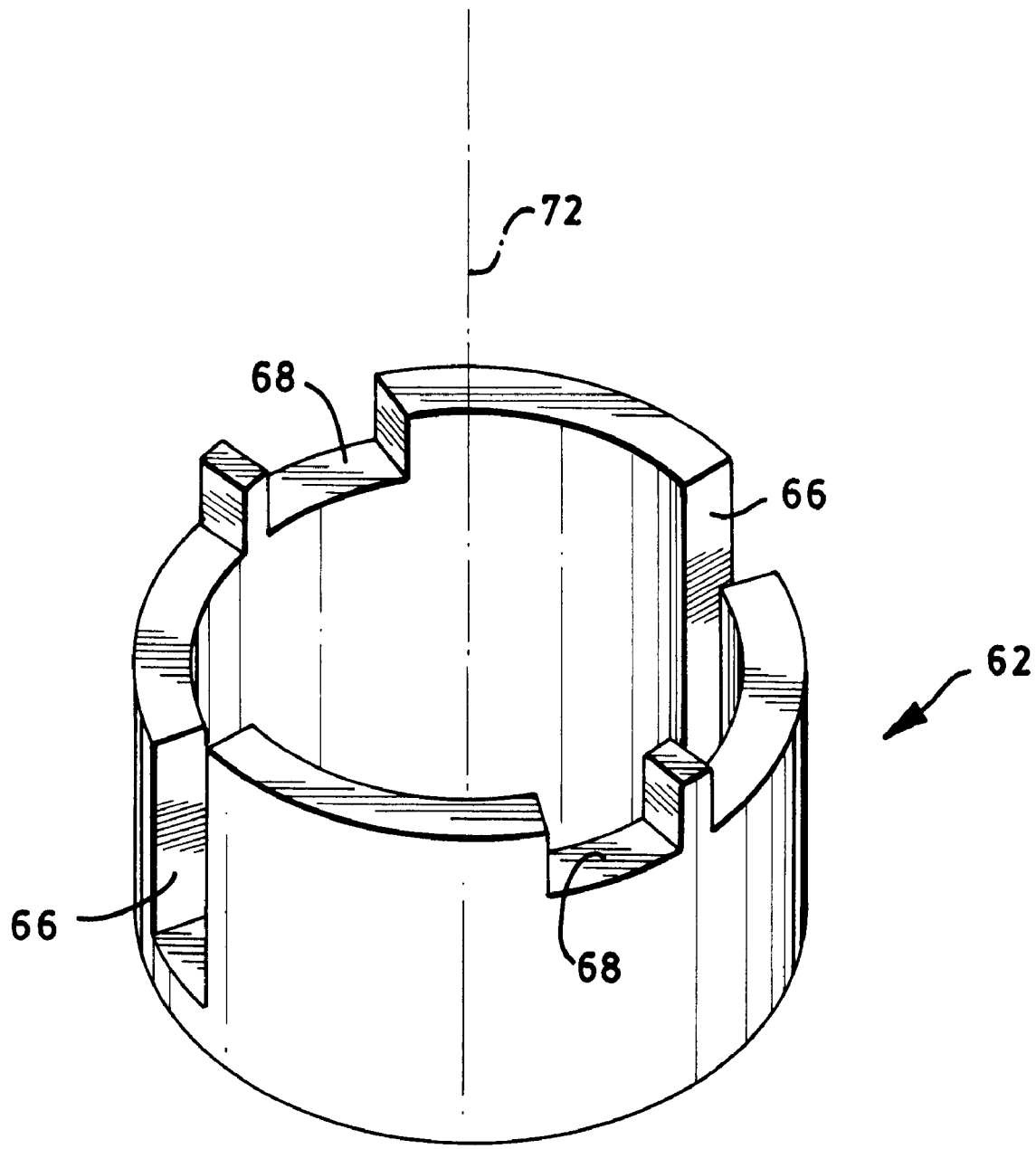
FIG. 5 is an illustration of a collar for the handset hook.

Referring to FIG. 5, a bayonet fitting 62 (e.g., a collar) for placing the hook 50 in one of two positions is shown without the hook 50 for clarity. The collar 62 can be an integral part of the upper surface 13 or, alternatively, the collar 62 can be attached with fasteners or adhesive to an inner face of the upper surface 13. A pair of long slots 66 formed in the collar 62 engage the tabs 60 when the hook 50 is in the extended wall mount position and prevents rotation of the hook 50 about a collar axis 72. Similarly, a pair of short slots 68 engage the tabs 60 when the hook 50 is in the retracted desk mount position and prevent its rotation about the collar axis 72.

Referring back to FIG. 4A, the spring 58 biases the proximal end of the hook 50 through the upper body 13 until the tabs 60 contact the ends of the long slots 66. Under normal use, a user places the handset into the cradle area 15 of the console 12 and the notch portion 52 and tip 54 of the hook 50 engage the handset. If, however, a user applies excessive force in returning the handset to the cradle, hook 50 is free to retract into the console 12 so that the tip 54 is not damaged. The hook 50 returns to its normal position after the force is removed.

Figure 4B:
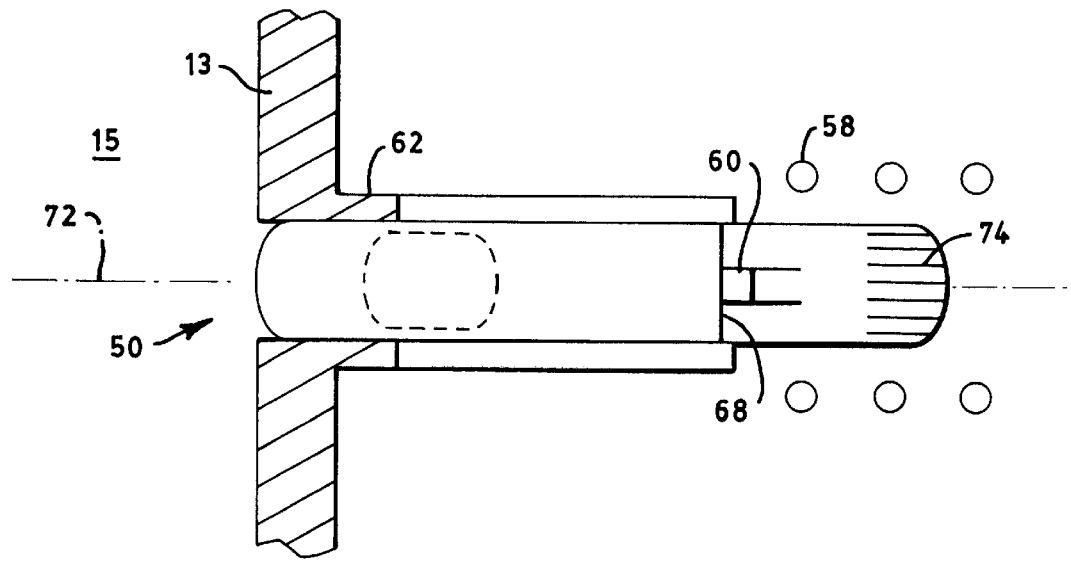

The hook 50 also includes a grip 74 that can be accessed through an opening 17 in the base 14. In order to change the position of the hook 50 from wall mount compatible to desk mount compatible, a user can pull the hook 50 by the grip 74 until the tabs 60 are not constrained by the long slots 66, rotate the hook 50 through 90° and release the hook 50 with the tabs 60 engaged in the short slots 68 as illustrated in FIG. 4B. The spring 58 applies sufficient force to maintain the tabs 60 at the bottom of short slots 68. In this position, the tip 54 is generally aligned with the upper body 13. Typically, the hook 50 can be flush with or slightly below the upper surface 13. The hook 50 thus does not interfere with placement of the handset in the cradle in the desk mount configuration.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A telephone console comprising:

a base including a bottom surface;

a stand engageable with the bottom surface, the stand comprising: a first surface disposable proximate the bottom surface at a first position relative to the base, and a first remotely disposed contact zone to orient the telephone console at a first angle relative to a mounting surface; and a second surface disposable proximate the bottom surface at the first position, and a second remotely disposed contact zone to orient the telephone console at a second angle relative to the mounting surface;

one of a male or female first surface connection portion connected to or defined at the first surface;

one of a male or female second surface connection portion connected to or defined at the second surface; and one of a male or female base first connection portion connected to or defined at the bottom surface for connection with said first surface connection portion.

2. The telephone console of claim 1 wherein the first angle is less than the second angle.

3. The telephone console of claim 1 wherein the stand has a cross-section described by a closed line figure.

4. The telephone console of claim 3 wherein the closed line figure is substantially triangular.

5. The telephone console of claim 1 wherein at least one of the first contact zone and the second contact zone is comprised of a non-skid material.

6. The telephone console of claim 1 wherein the first surface of the stand is disposed proximate the bottom surface at a second position to orient the telephone console at a third angle relative to the mounting surface.

7. The telephone console of claim 1 wherein the base has one or more feet disposed on the bottom surface.

8. The telephone console of claim 7 wherein the one or more feet are comprised of a non-skid material.

9. The telephone console of claim 1 wherein the base further comprises one or more clips for securing the stand to the base.

10. The telephone console of claim 9 wherein the stand includes at least one opening on the first surface or the second surface for engaging at least one of the one or more clips.

11. The telephone console of claim 1 wherein the first contact zone or the second contact zone comprises at least one foot comprised of a non-skid material.

12. The telephone console of claim 1 wherein the first contact zone or the second contact zone comprises a strip of non-skid material.

13. The telephone console of claim 1 wherein the first angle is between about 3 degrees and about 15 degrees and the second angle is between about 15 degrees and about 45 degrees.

14. A telephone console comprising:

a body including a cradle region for accepting a handset, the body including a wall forming an opening disposed through the cradle region and a collar fitting positioned at said opening; and a handset hook having an elongated body movable through the opening and having a proximal end and a distal end, the proximal end being adapted to engage the handset and the distal end being adapted to engage the fitting having an axial guide surface positioning the proximal end in a first position and defining an axial guide path and having a radially extending axially inwardly second fixing surface for holding the elongated body with the proximal end in a second position such that the proximal end protrudes into the cradle region to engage the handset in the first position and the proximal end is retracted from the cradle region in the second position.

15. The telephone console of claim 14 further comprising: a spring having a proximal end and a distal end; and a reaction surface against which the distal end of the spring reacts, the spring being disposed between the reaction surface and the handset hook, wherein the spring biases the handset hook into contact with the fitting.

16. The telephone console of claim 14 wherein the first position comprises a first axial position and a first circumferential position and the second position comprises a second axial position and a second circumferential position.

17. The telephone console of claim 15 wherein the handset hook further comprises a tab extending transverse to the elongated body against which the proximal end of the spring reacts.

18. The telephone console of claim 17 wherein the fitting comprises a first slot generally parallel to the elongated body and a second slot generally parallel to the elongated body wherein the tab engages an end of the first slot when the handset hook is in the first position and the tab engages an end of the second slot when the handset hook is in the second position.

19. The telephone console of claim 14 wherein the body includes a bottom surface forming an opening for access to the handset hook for actuation of the hook between the first position and the second position and said elongated body has a grip at or near said proximal end for actuation of the hook.

20. A telephone console comprising:

a body including a bottom surface and a cradle region for accepting a handset, the body including a wall forming an opening disposed through the cradle, the wall comprising a fitting having an axial guide surface positioning the proximal end and defining a guide path and having a radially extending second fixing surface for holding the proximal end in a second position;

a stand engageable with the bottom surface, the stand comprising: a first surface disposable proximate the bottom surface at a first position relative to the base, and a first remotely disposed contact zone to orient the telephone console at a first angle relative to a mounting surface; and a second surface disposable proximate the bottom surface at the first position, and a second remotely disposed contact zone to orient the telephone console at a second angle relative to the mounting surface; and a handset hook having an elongated body movable through the opening and having a proximal end and a distal end, the proximal end being adapted to engage the handset and the distal end being adapted to engage the fitting in at least two positions such that the proximal end protrudes into the cradle region to engage the handset in the first position and the proximal end is retracted from the cradle region in the second position.

21. A telephone console comprising:

a base including a bottom surface;

a stand engageable with the bottom surface, the stand comprising:

a first surface disposable proximate said bottom surface at a first position relative to the base, and a first remotely disposed contact zone to orient the telephone console at a first angle relative to a mounting surface; and a second surface disposable proximate the bottom surface at the first position, and a second remotely disposed contact zone to orient the telephone console at a second angle relative to the mounting surface;

a first connection portion defined by said stand for connecting said stand in said first position; and a second connection portion defined by said stand for connecting said stand in said second position.

22. The telephone console of claim 21 wherein said first connection portion is defined at said second surface.

23. The telephone console of claim 21 wherein said second connection portion is defined at said first surface.

24. The telephone console of claim 21 further comprising: a first cooperating connection portion defined by said stand and a second cooperating connection portion defined by said stand wherein said base includes first and second opposed latching elements, said first latching element for engaging one of said first connection portion and said second connection portion, depending upon the position of said stand and said second latching element for engaging one of said first cooperating connection portion and said second cooperating connection portion, depending upon the position of said stand.

25. The telephone console of claim 24 wherein said base includes third and forth opposed latching elements defining a second stand mounting location which is spaced a distance from a first stand mounting location defined by said first and second opposed latching elements, said third latching element for engaging one of said first connection portion and said second connection portion, depending upon the position of said stand and said forth latching element for engaging one of said first cooperating connection portion and said second cooperating connection portion, depending upon the position of said stand.

26. The telephone console of claim 24 further comprising an additional first connection portion and an additional cooperating first connection portion defined by said stand for connecting said stand in said first position and an additional second connection portion and an additional cooperating second connection portion defined by said stand for connecting said stand in said second position wherein said base includes first additional and second additional opposed latching elements, said first and second opposed latching elements and said first additional and second additional opposed latching elements cooperating to define a first stand mounting location, whereby four first connection portions of said stand are engaged for connecting said stand in said first position at said first stand mounting location and four second connection portions of said stand are engaged for connecting said stand in said second position at said first stand mounting location.

27. The telephone console of claim 24, wherein said connection portions are openings formed in said stand or a side wall of said stand.

28. The telephone console of claim 21 wherein said stand has a substantially triangular shape in cross section with said first remotely disposed contact zone being provided at an apex of the triangle and said second remotely disposed contact zone being provided at another apex of the triangle.

29. The telephone console of claim 26 wherein said first surface is either mounted substantially flush with said base or has two contact surface portions in contact with said base and said surface portion is either mounted substantially flush with said base or has two contact surface portions in contact with said base.

* * * * *